(12) United States Patent
Sukumaran et al.

(10) Patent No.: US 11,663,045 B2
(45) Date of Patent: May 30, 2023

(54) SCHEDULING SERVER MAINTENANCE USING MACHINE LEARNING

(71) Applicant: Dell Products L. P., Round Rock, TX (US)

(72) Inventors: Shanand Reddy Sukumaran, Kulim (MY); Lead Ta Choo, Puchong (MY)

(73) Assignee: Dell Products L.P., Round Rock, TX (US)

(*) Notice: Subject to any disclaimer, the term of this patent is extended or adjusted under 35 U.S.C. 154(b) by 550 days.

(21) Appl. No.: 16/836,624

(22) Filed: Mar. 31, 2020

(65) Prior Publication Data

US 2021/0303348 A1    Sep. 30, 2021

(51) Int. Cl.
G06F 9/44      (2018.01)
G06F 9/50      (2006.01)
G06N 20/10     (2019.01)
G06F 11/30     (2006.01)
G06N 7/01      (2023.01)

(52) U.S. Cl.
CPC .......... *G06F 9/505* (2013.01); *G06F 11/3006* (2013.01); *G06N 7/01* (2023.01); *G06N 20/10* (2019.01); *G06F 2201/835* (2013.01)

(58) Field of Classification Search
USPC ........................................................ 718/104
See application file for complete search history.

(56) References Cited

U.S. PATENT DOCUMENTS

| | | | |
|---|---|---|---|
| 2018/0198733 A1* | 7/2018 | Morgan | H04L 43/0876 |
| 2019/0392345 A1* | 12/2019 | Adaska | G06N 20/00 |
| 2020/0127900 A1* | 4/2020 | Wright | G06F 11/3485 |

* cited by examiner

*Primary Examiner* — Timothy A Mudrick
(74) *Attorney, Agent, or Firm* — Krishnendu Gupta; Deepika Bhayana

(57) ABSTRACT

A method and apparatus using machine learning for scheduling server maintenance. In one embodiment of the method, load values for a server are recorded over a period of time, wherein each of the load values is time stamped with a date and time. A first plurality of the load values are classified. The classified first plurality of values are then processed to create a model for predicting a load value of the server. The model is used to generate a first predicted load value of the server for a first date and a first time.

20 Claims, 6 Drawing Sheets

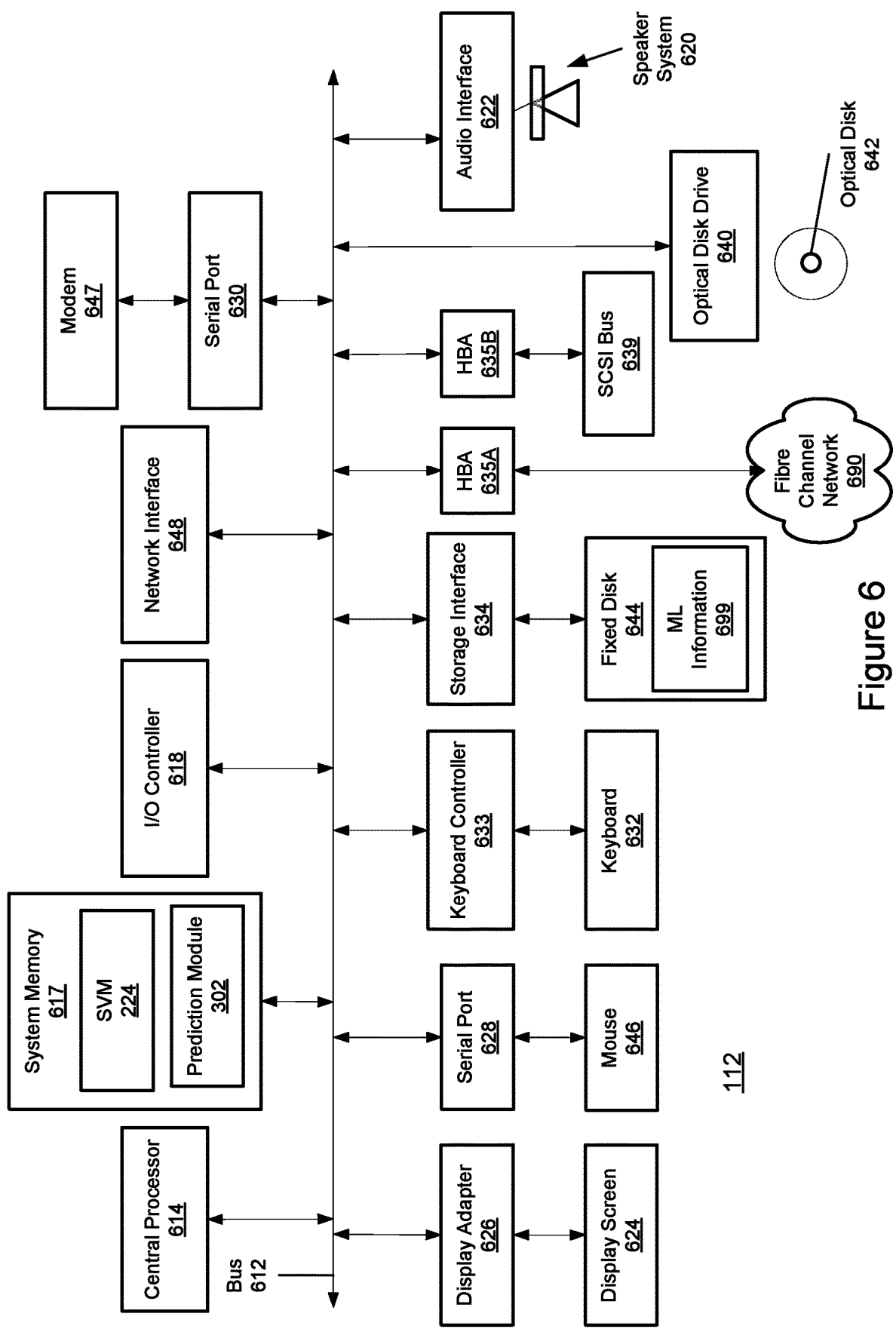

SCHEDULING SERVER MAINTENANCE USING MACHINE LEARNING

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Maintenance is a term that describes the process of keeping modern information handling systems updated and running efficiently. It is crucial for businesses to maintain their information handling systems (e.g., servers) to ensure their optimization. A server is a standalone information handling system that provides data and other services to one or several other information handling systems on a given network. The main benefit to a server is that it allows centralized management and monitoring of network access and network data, and servers can have power, hard drive and processor redundancies that are typically not available in a personal computer. Server examples include file servers, domain controllers, web servers, etc.

Several checks, verifications, or updates can be performed during server maintenance. For example, data backups should be checked to ensure backup operations are working correctly. Disk use should be checked. If disk use exceeds 90% capacity it may be advisable to add more storage. As a server reaches 100%, it could result in database corruption and loss of data. If server is using RAID, the RAID's error notification system should be checked to ensure it is configured properly and works as expected. Updates for Linux systems are released almost daily, and weekly for Windows. Many of these fix important security issues. Operating systems should be updated on a daily or weekly basis. CPU, memory and network utilization should be checked regularly. If the server is nearing limits hardware upgrades may be needed. Server maintenance can be scheduled on a daily, weekly, and/or monthly basis. For example, a server's database may need to be optimized (e.g., defragmented) to ensure high performance.

Many businesses, including those who sell their products or services online those, want their servers to be continuously online and available for use by their customers. Any downtime, including down time for server maintenance, can adversely affect businesses. Some less than critical servers can be taken off-line for maintenance during periods of low use. Businesses do not like to take critical servers offline for maintenance. Rather, businesses prefer online maintenance of critical servers. Ideally these critical servers should be maintained during periods of low use.

It is challenging for network administrators to determine the best time for offline or online server maintenance. Network administrators create a maintenance schedule based upon a network administrator's knowledge of the business, the days and times when server demand is observed to be low, etc. This knowledge can be imperfect, which could lead to a less than optimal schedule for server maintenance. Moreover, the times during which server demand is low may depend upon time of the year. Proposed maintenance schedules are often rejected by business managers as being based upon incomplete knowledge of low demand times of server use.

SUMMARY

A method and apparatus using machine learning for scheduling server maintenance. In one embodiment of the method, load values for a server are recorded over a period of time, wherein each of the load values is time stamped with a date and time. A first plurality of the load values are classified. The classified first plurality of values are then processed to create a model for predicting a load value of the server. The model is used to generate a first predicted load value of the server for a first date and a first time.

BRIEF DESCRIPTION OF THE DRAWINGS

Embodiments of methods and systems such as those disclosed herein may be better understood, and their numerous objects, features, and advantages made apparent to those skilled in the art by reference to the accompanying drawings. For ease of discussion, the same reference numbers in different figures may be used to indicate similar or identical items.

FIG. 6 is a block diagram depicting a computer system suitable for implementing aspects of an embodiment of the present disclosure.

Figure 1:
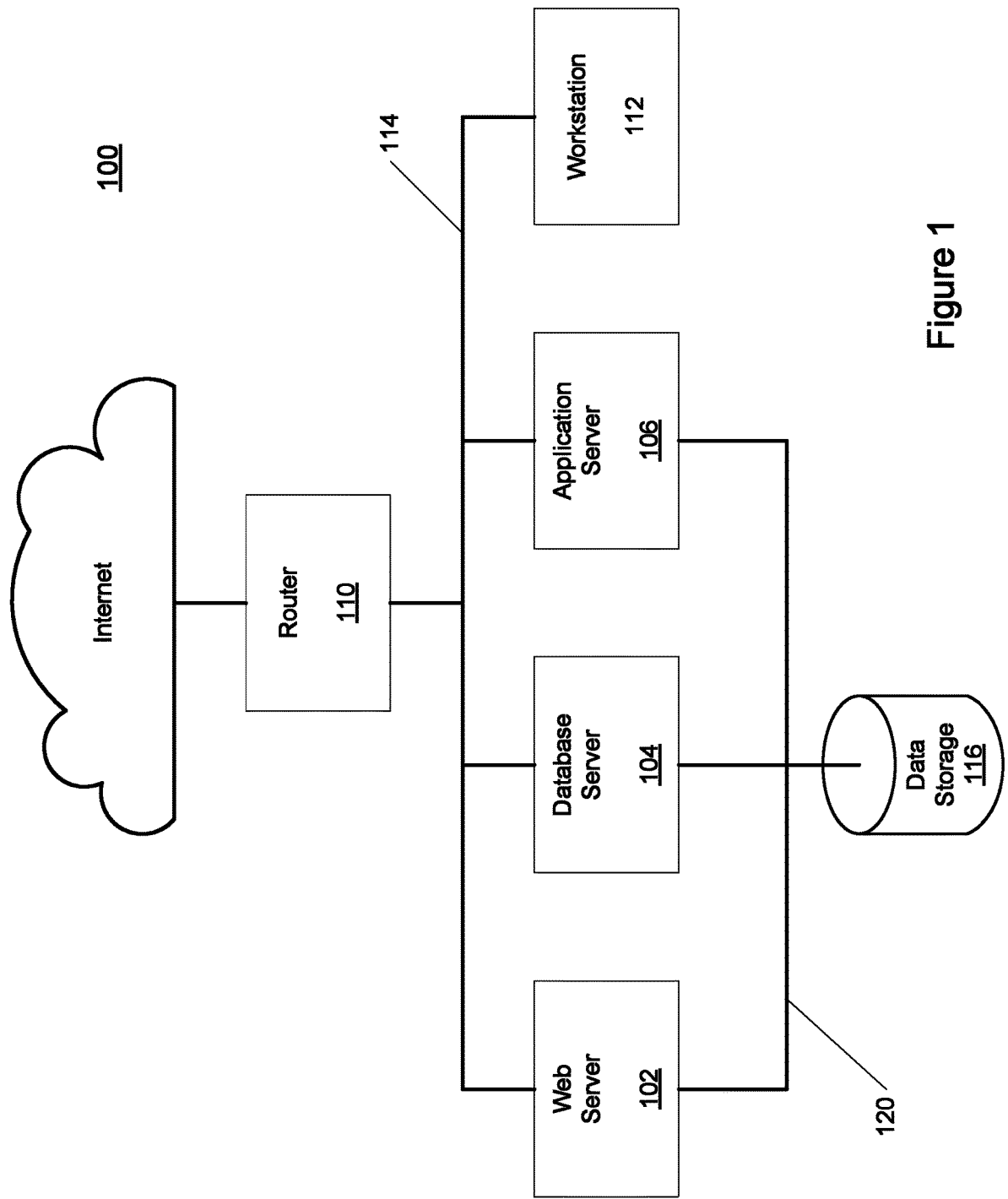
FIG. 1 is a simplified block diagram illustrating an example network employing an embodiment of the present disclosure.

While embodiments such as those presented in the application are susceptible to various modifications and alternative forms, specific embodiments are provided as examples in the drawings and description of example embodiments. It should be understood that the drawings and description of example embodiments are not intended to limit the embodiments to the particular form disclosed. Instead, the intention is to cover modifications, equivalents and alternatives falling within the spirit and scope of methods and systems such as those described herein, as defined by the appended claims.

DETAILED DESCRIPTION

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components. It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism.

As mentioned above businesses prefer their servers to be online and available for use by customers 24 hours a day and seven days a week. Any downtime, including down time for server maintenance, can adversely affect businesses. If it must be done, businesses prefer to schedule server maintenance for periods of time that are the least disruptive to customers. It is desirable to devise a method or apparatus that selects the optimal time for server maintenance, which can be done on a server by server basis. While the present disclosure will be described with reference to method and apparatus for selecting optimal time for server maintenance, it should be understood that the present disclosure should not be limited thereto. The apparatus and method of the present disclosure could be used to determine the optimal time to service devices other than servers. For example, the apparatus and method could be used to schedule optimal times for memory storage array maintenance.

In one embodiment, the apparatus or method employs machine learning to determine the optimal time for server maintenance. Ideally, the optimal time is when server load is at its lowest. As will be more fully described below machine learning (e.g., support vector machines) uses server load values or weighted server load values to create a model (e.g., a support vector machine model), which in turn can be used to determine optimal times for server maintenance. Monitor systems can be used to monitor and record server load values at various times of the day. Monitor systems can execute on the servers they monitor, or monitor systems can monitor servers remotely. During heavy use, the load on the server will be high, and during light use of the server the load will be low. Monitor systems record load values accordingly.

Monitoring systems may record CPU, disk, memory, I/O network load values, which may be expressed as percentage, each hour over a given period of time (e.g., a year). The values are time stamped and stored within files for subsequent processing by a machine learning module. Before processing by the machine learning module, the load values for server can be classified as being low or high. A portion of these classified load values can be processed by machine learning (e.g., a support vector machine) to create a model for predicting future load values for the server. More particularly, the model can be used to generate a predicted load value for the server for a particular time of the day and a particular day of the year.

Machine learning is a subset of artificial intelligence. Machine learning is closely related to computational statistics, which focuses on making predictions using computers. Machine learning is classified into several broad categories. Supervised learning can be used to create a function that maps an input to an output based on example input-output pairs. It infers the function from labeled training data consisting of a set of training examples. In supervised learning, each example is a pair consisting of an input object and a desired output value. A supervised learning algorithm analyzes the training data and produces an inferred function.

Support-vector machines (SVMs) are supervised learning models that can be used for data classification and regression. Regression can be used to produce continuous prediction outputs, meaning they may have any value within a range. Given a set of training examples (e.g., memory load, CPU load, etc.), each marked as belonging to one or the other of two categories (e.g., low or high), an SVM training algorithm builds a model that can assign new examples to one category or the other, making it a non-probabilistic binary linear classifier. An SVM model is a representation of the examples as points in space, mapped so that the examples of the separate categories are divided by a clear gap that is as wide as possible. The model can be used to find a regression function for working with continuous variable inputs. The present disclosure describes a method and apparatus that uses SVM for predicting optimal time for server maintenance, it being understood that the present disclosure should not be limited to use of SVM.

FIG. 1 illustrates a network 100 that implements one embodiment of the present disclosure. Network 100 receives and processes transaction requests from customer computer systems (not shown) via the Internet. For the purposes of explanation only, the present disclosure will be described with reference to network 100, which is configured to receive and process transaction requests related to the purchase of information handling systems (e.g. desktop or laptop computers).

Network 100 includes servers 102-106 coupled to a router 110 and workstation 112 via local area network 114. Servers 102-106 require periodic maintenance. Workstation 112, or a similar information handling system, is configured to generate an optimized maintenance schedule for each of the servers 102-106 using an SVM model. Workstation 112 implements SVM algorithms for creating the SVM model using recorded load values for each server. Each server maintenance schedule created by workstation 112 should include the date(s) and time(s) for server maintenance that will be the least disruptive to operation of network 100 in general and to use by customers in particular. FIG. 1 shows 3 servers 102-106, and accordingly, workstation 112 can generate three distinct maintenance schedules, one for each server. The present disclosure could be used to generate schedules for more than three servers or fewer than three servers.

Figure 2:
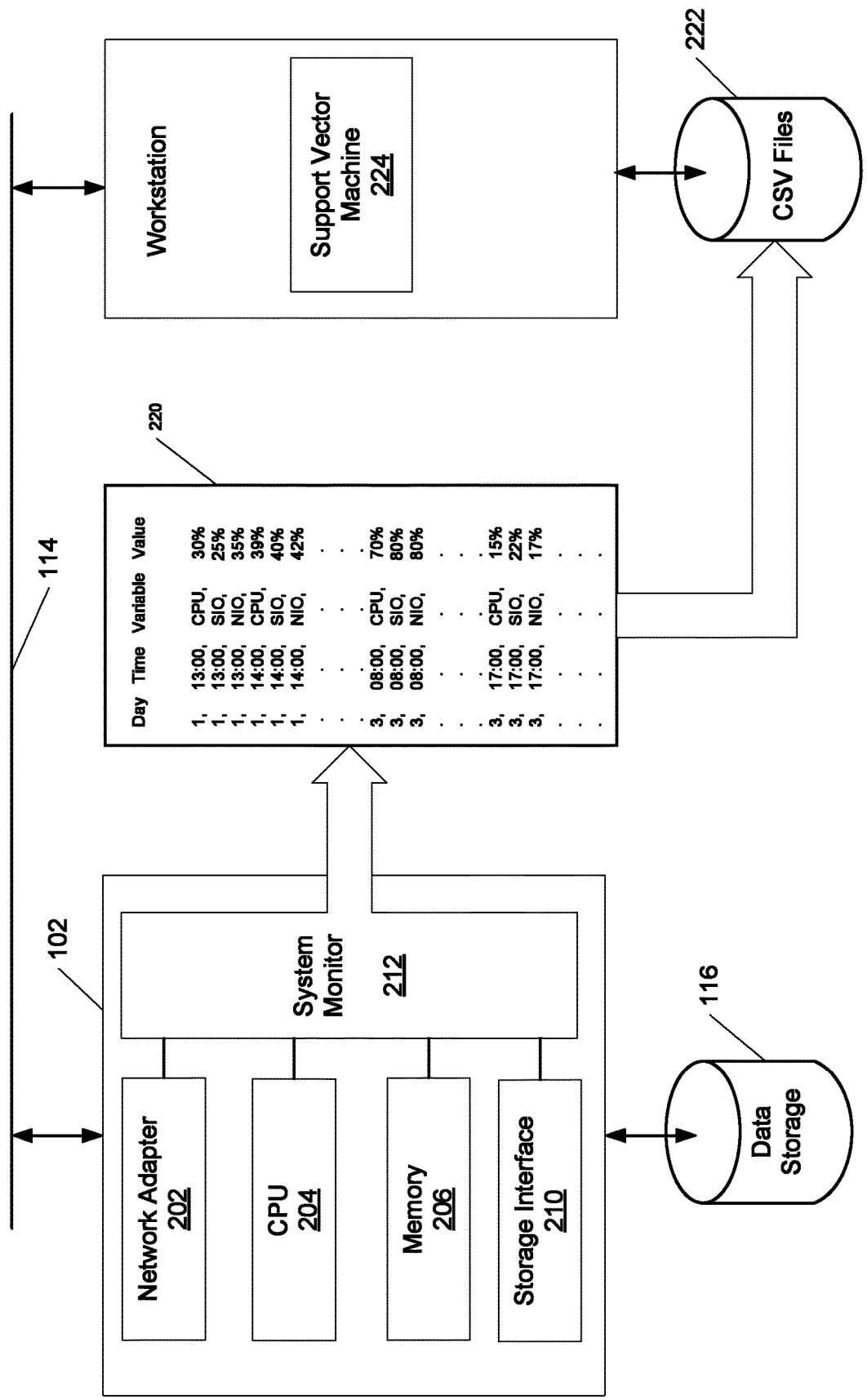
FIG. 2 is a simplified block diagram illustrating an example server employed in the network of FIG. 1.

With continuing reference to FIG. 1, FIG. 2 illustrates one example of server 102 in block diagram form. Servers 104 and 106 may be substantially similar to the server 102 shown in FIG. 2. The remaining disclosure will describe the generation and use of one or more SVM models for server 102, it being understood that similar SVM models can be generated and used by workstation 112 for servers 104 and 106.

Server 102 includes several components including network adapter 202, CPU 204, memory 206, and storage interface 210. In addition, server 102 includes a system monitor 212, which measures and records component load values on a regular basis. Component load values can be recorded by system monitor 212 in monthly, weekly, daily, and/or hourly increments. The increment selected may relate to the duration of time needed for expected server maintenance. For example, if server maintenance is expected to be less than 30 minutes, the system monitor may record server load values in 30 minute increments. Or, if server maintenance is expected less than an hour, system monitor 212 may record server load values every hour. Each recorded load value may be an average of the load value over the increment period. Load values for CPU, memory, network adapter, and storage interface can be recorded and expressed as a percentage of use, and these values can be used by SVM 224 executing on workstation 112 as will be more fully described below. For purposes of explanation only, system monitor 212 records and time stamps CPU, storage 10, network 10, etc., load values every hour. A system monitor on a different server within network 100 may record load values at a different predetermined increment (e.g., daily).

Every hour monitor system 212 can measure and record the load on network adapter 202, which is expressed as a percentage of the maximum number or I/O transactions that network adapter 202 can receive and process without substantial delay. A network adapter 202 load of 90% indicates the network adapter is approaching its maximum transaction bandwidth. System monitor 212 can measure and record CPU 204 load each hour, which is expressed as a percentage of the number of instructions CPU 204 can execute in a given period of time. System monitor can also measure and record the storage access request load on storage interface 210. This value too can be expressed as a percentage of the number of access requests the storage interface 210 can handle in a given period of time without undue delay. System monitor to into can measure and record the percentage of memory use as a load value. System monitor 212 can measure and record additional load values for other components, either software or hardware, of server 102 that are not shown in FIG. 2.

After being time stamped, system monitor 212 can save each load value it measures to a comma-separated values (CSV) data file. A CSV file is a delimited text file that uses commas to separate values. Each line of the file is a data record. Each record consists of one or more fields, separated by commas. FIG. 2 illustrates an example CSV file 220 of load values recorded every hour by system monitor 212 over the course of a year. System monitor 212 may continuously record, time stamp, and store load values in file 220. As shown, each load value is identified (e.g., CPU load value) and expressed as a percentage. System monitor 212 can transfer file 220 to disk storage 222 for subsequent processing by SVM module 224 as will be more fully described below. Although not shown, disk storage 222 stores additional CSV files, one for each of the servers of network 104 for which a maintenance schedule is to be generated. Servers 102-106 may continuously update the CSV files in storage 116 by adding new values thereto.

Workstation 112 or other similar information handling system, includes SVM 224, which can access and process each of the CSV files stored within 222 to generate respective SVM models for respective servers 102-106. Each SVM model can be used to predict overall load on a respective server during different times of the day, and days of the year. Load predictions can be used to determine the best dates and times to schedule maintenance for respective servers. The load predictions may take into account holidays, business peaks, weekends, special time periods, and the like when predicting a time to perform server maintenance. For example, if a particular server is used to process e-commerce transactions, then the SVM model may be built to take into account a time period prior to school starting when "back to school" specials are advertised, Black Friday (e.g., the Friday after Thanksgiving in the United States) sales, Memorial Day sales, and the like. The remaining disclosure will describe the use of CSV file 220 to create an SVM model that can be used for scheduling the optimal date and time for server 102 maintenance. The process described below can also be used to for scheduling the optimal maintenance dates and times for the other servers of network 100.

SVM 224 splits the load values in the CSV file into training load values and testing load values. For example 80% percent of the load values can be designated as training load values for use in training an SVM model, while the remaining 20% can be designated as testing load values for testing the accuracy of the SVM model. In one embodiment, SVM 224 calculates a SVM model for server 102 using all the training load values (CPU load values, memory load values, network adapter load values, etc.). In this embodiment, an average of the various load values is calculated for each timestamp thereof. The load values can be weighted before they are averaged in another embodiment. In this other embodiment, for example, load values may be multiplied by a first weight, memory load values may be multiplied by a second weight, and network load values may be multiplied by a third weight, before summing the result of the three multiplications. In this way, the SVM model determined for server 102 may differ from the SVM model determined for other servers. For example, for a server that performs computationally intensive tasks, e.g., by performing payroll, accounting, invoicing, or the like, the first weight may be greater than the second weight and the third weight. For a server that performs a large amount of storage I/O, e.g., because the server hosts frequently accessed data (e.g., in a database), the second weight may be greater than the first weight and the third weight. For a server that performs a large amount of network I/O, e.g., because the server distributes tasks among multiple servers, the third weight may be greater than the first weight and the second weight. In this way, by adjusting the three weights for each of the servers based on the type of tasks performed, the SVM model reflects the primary tasks that the server performs. For example, a particular server that hosts multiple databases may be given a higher second weight to give greater weight to the memory load being performed by the particular server. In another embodiment, SVM 224 calculates a SVM model for server 102 using a subset of the training load values, weighted or unweighted.

Thereafter, SVM 224 can test the SVM model for accuracy using the testing load values. More particularly, load values for server 102 are predicted using the SVM model and the timestamps of respective testing load values. The predicted load values are compared to the testing load values. If the predicted load values indicate the model is 90% accurate or higher, the SVM model is deemed reliable and can used for generating maintenance schedules. If predicted load values indicate the SVM model is less than 90% accurate, the SVM model can be retrained using adjusted SVM algorithms or additional training load values.

Figure 3:
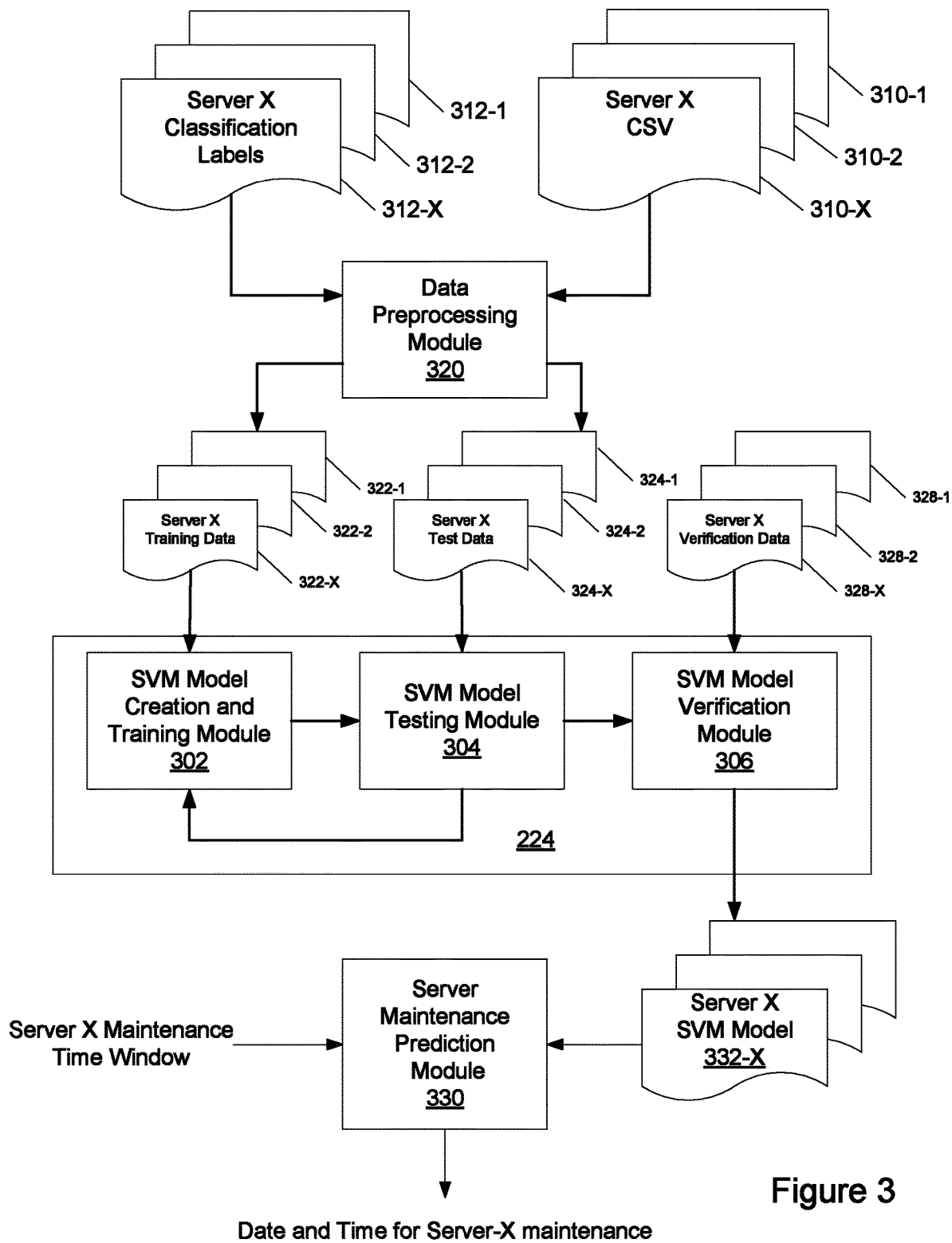
FIG. 3 is a simplified block diagram illustrating relevant aspects of the workstation employed in FIGS. 1 and 2.

FIG. 3 illustrates a more detailed view of the SVM 224. More particularly, module 224 includes an SVM model creation and training module 302, which is configured to receive training load values (hereinafter training data). Training module 302 generates an SVM model using the training load values as will be more fully described below. Training module 302 presents the SVM model it creates to testing module 304. The testing module 304 tests the accuracy of the SVM model based upon test load values (hereinafter test data) for the server as will be more fully described below. Testing module 304 may provide feedback to training module 302 based on the testing in order to fine-tune the SVM module. If the SVM module is found to meet expectations (e.g., 90% accurate) the model can be provided to SVM model verification module 306 for further verification using real-time data load values provided by server 102.

FIG. 3 shows CSV files 310, which contain load values for respective servers of 100. FIG. 3 also shows classification label files 312 for respective servers of network 100. Each classification label file 312 includes classification labels mapped to thresholds. In one embodiment, the classification labels include "low" and "high." In one embodiment classification labels are mapped to respective threshold values. For example, the label "low" can be mapped to threshold of 35%. If training data (e.g. a load value such as CPU load value, or an average of load values having the same timestamp) is less than 35%, the training data is labeled "low." The "high" label can be mapped to threshold equal to 85%. If training data (e.g. a load value such as CPU load value, or an average of load values having the same timestamp) is greater than 85%, the training data is labeled "high." Alternatively, a single threshold can be used to determine whether training data is to be labeled high or low. For example, training data (e.g. a load value such as CPU load value, or an average of load values having the same timestamp) can be labeled low if the training data is less than 50%, or labeled high the training data is greater than 50%.

Figure 4:
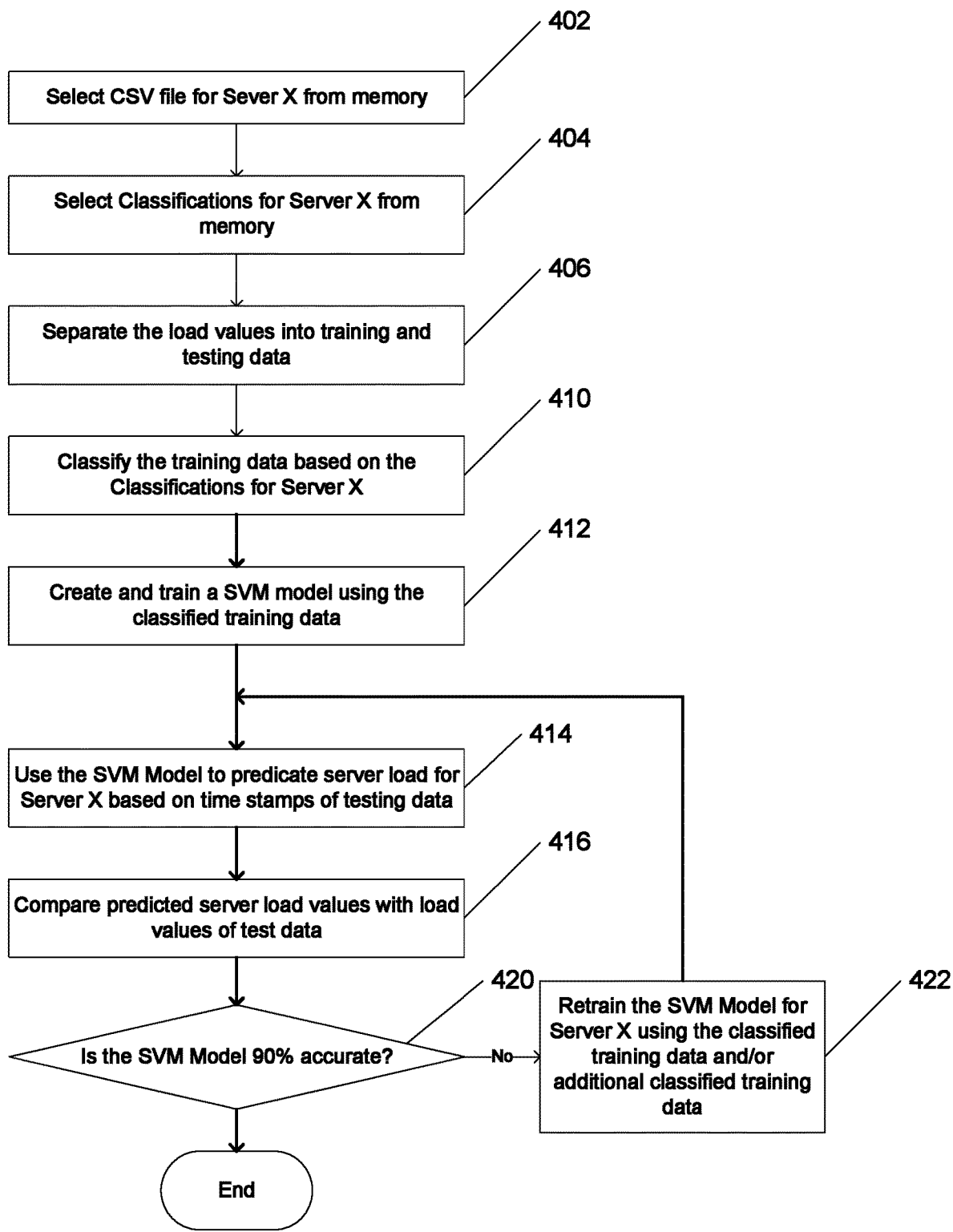
FIG. 4 is a flow chart illustrating relevant aspects of a process implemented by the workstation of FIG. 3.

With continuing reference to FIG. 3, FIG. 4 is a flowchart illustrating relevant aspects performed by SVM 224 when calculating an SVM model according to one embodiment. In steps 402 and 404 a file 312 containing classification labels and a file 310 containing a corresponding CSV for a respective server are selected and provided as inputs to a data processing module 320 executing on the workstation 112. As shown in step 406 data preprocessing module 320 randomly divides the labeled load values of the CSV vile 310 into two data sets: a set containing training data, and; a set containing test data. In one embodiment, data processing module 320 divides the load values according to an 80/20 percentage basis, with 80% of the load values being designated as training data and 20% of the load value being designated as test data. Data processing module 320 classifies each training data as either "high" or "low" based upon a comparison of the training data to threshold(s) mapped to the label pair in the classification label file 312. It is noted that the classification label file 312 for each server can contain a different threshold or thresholds. This can be done based upon a percentage assigned for each server. For example, server X may be assigned an 80/20 split of load values into training and testing. In step 410, the preprocessing module classifies the training values (e.g., low and high) based upon the thresholds for the classifications.

In step 412, SVM model creation and training module 302 creates and trains and SVM model using the training data classified in step 410. More formally, training module 302 constructs a hyperplane or set of hyperplanes in a high dimensional space, which can be used for classification, regression, or other tasks like outliers detection. Intuitively, a good separation is achieved by the hyperplane that has the largest distance to the nearest training-data point of any class (so-called functional margin), since in general the larger the margin, the lower the generalization error of the classifier. In step 414 training module 302 runs the test data it receives from data processing module 320 through the SVM model created by module 302. More particularly, module 304 runs the timestamps of the testing data through the SVM model to obtain corresponding predicted load values. Load values of the test data are compared to the predicted load values, respectively. If it is determined based upon the comparison that the SVM model is 90% accurate, then the process ends. However, if the SVM model determined to be less than 90% accurate then the process proceeds to step 422 where module 302 retrains the SVM model with additional training data or adjusted algorithms. Eventually, the process should yield an SVM model that is at least 90% accurate, and this accurate model can be verified by verification module 306 using contemporaneous load values provided by the system monitor of server 102. Once verified, the resulting SVM model 332 is provided to a server maintenance production module 330.

Figure 5:
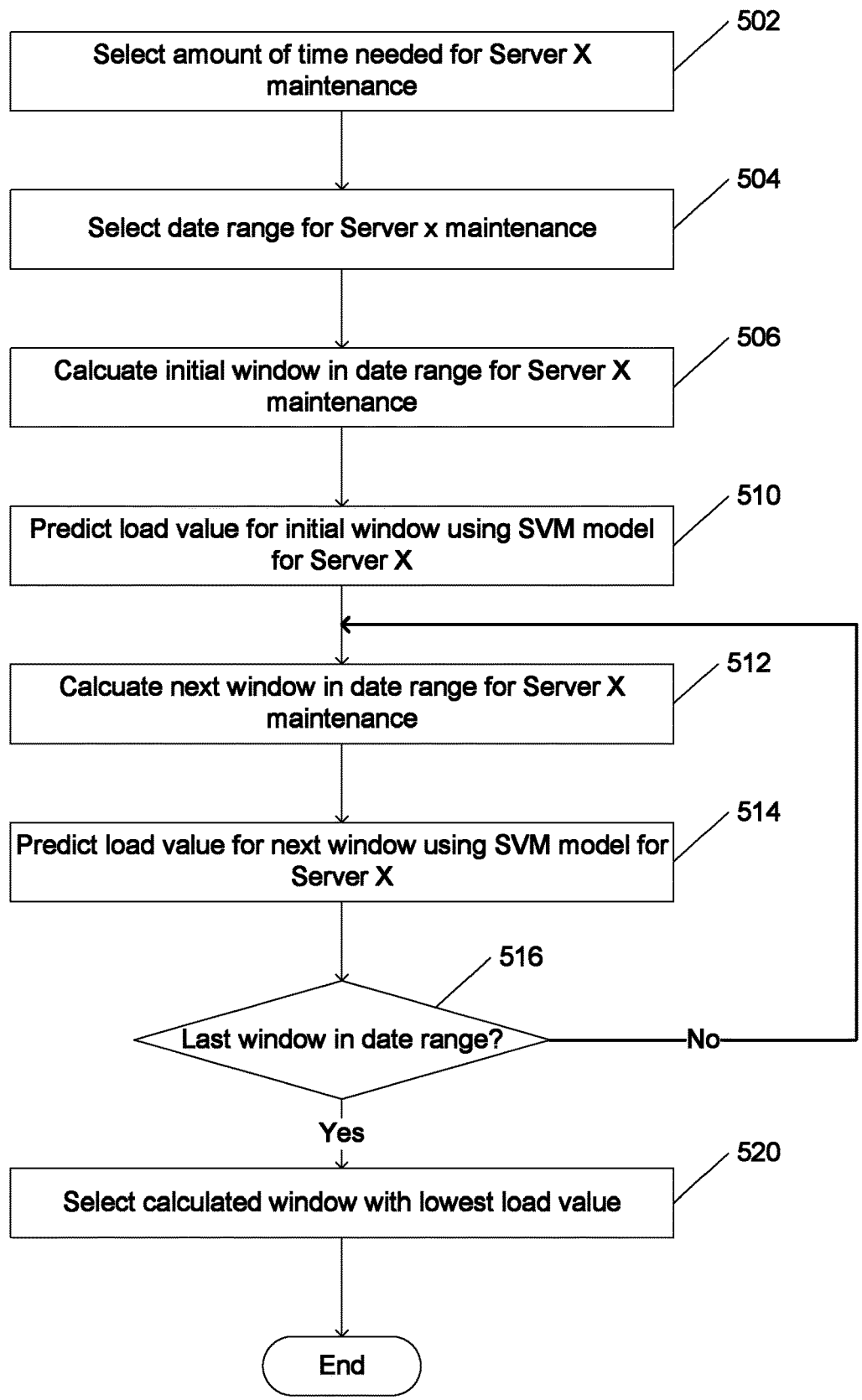
FIG. 5 is a flow chart illustrating relevant aspects of a process implemented by the workstation of FIG. 3.

FIG. 5 is a flowchart illustrating relevant aspects of a process implemented by server maintenance production module 330 for scheduling maintenance for a server (i.e. server X). In step 502, an amount of time needed for server X maintenance is selected. For example, a network administrator can determine that at least one hour is needed for server X maintenance. For example, a network administrator can select the first week of the month as the date range for server X maintenance on a monthly basis. In step 506, module 330 calculates an initial time window in the selected date range for server X. The initial window of time should be equal to the time selected in step 502 and at the beginning of the selected date range. Using SVM model 332, prediction module 330 predicts the load value for server X in step 510 using the time of the initial time window and the verified SVM model 332. Thereafter, module 330 calculates the next sequential window in the selected date range for server X maintenance as shown in step 512. Module 330 uses verified SVM model 332 and the time at which the next window begins to predict the load value on server X for the next time window calculated in step 512. In step 516 module 330 determines whether the last window in the date range has been used to calculate a corresponding predicted load value. If not, the process repeats with step 512. Otherwise, module compares the load values for the calculated windows in order to determine the lowest. That lowest value is selected, and its corresponding time window is provided as the most optimal time in the selected date range for maintenance of server X.

As shown above, the present disclosure can be implemented in an information handling system such as workstation 112. An example of one such information handling system is described below with reference to FIG. 6. More particularly, FIG. 6 depicts a block diagram of an information handling (e.g., computer system) suitable for implementing aspects of the present disclosure. The computer system includes a bus 612 which interconnects major subsystems of computer system, such as a central processor 614, a system memory 617 (typically RAM, but which may also include ROM, flash RAM, or the like), an input/output controller, an external audio device, such as a speaker system 620 via an audio output interface 622, an external device, such as a display screen 624 via display adapter 626, serial ports 628 and 630, a keyboard 632 (interfaced with a keyboard controller 633), a storage interface 634, a floppy disk drive 637 operative to receive a floppy disk 638, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. Also included are a mouse 646 (or other point-and-click device, coupled to bus 612 via serial port 628), a modem 647 (coupled to bus 612 via serial port 630), and a network interface 648 (coupled directly to bus 612).

Bus 612 allows data communication between central processor 614 and system memory 617, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 610 are generally stored on and accessed via a computer-readable medium, such as a hard disk drive (e.g., fixed disk 644), an optical drive (e.g., optical drive 640), or other computer-readable storage medium.

Storage interface 634, as with the other storage interfaces of computer system 610, can connect to a standard computer-readable medium for storage and/or retrieval of information, such as a fixed disk drive 644. Fixed disk drive 644 may be a part of the computer system or may be separate and accessed through other interface systems. Network interface 648 may provide a direct connection to a server via a direct network link.

Also depicted in FIG. 6 is SVM 224 and prediction module 330, which are shown as being stored in system memory 617, and as a result of such depiction, indicate their execution. SVM 224 and prediction module 330 can, when implemented as program instructions, provide the functionality of the methods and systems described herein. Further, the depiction of SVM 224 and prediction module 330 serve merely as examples, and so are not to be interpreted as requiring any of these modules to be executed in conjunction with any other of these modules on the same computing device.

Many other devices or subsystems (not shown) may be connected in a similar manner Conversely, all of the devices shown in FIG. 6 need not be present to practice the present invention. The devices and subsystems can be interconnected in different ways from that shown in FIG. 6. The operation of a computer system such as that shown in FIG. 6 is readily known in the art and is not discussed in detail in this application. Code to implement the present invention can be stored in computer-readable storage media such as one or more of system memory 617, fixed disk 644, or optical disk 642. The operating system provided on the computer system may be MS-DOS®, MS-WINDOWS®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   collecting load values for a server over a period of time, wherein each of the load values is time stamped with a date and time at which a respective load value of the load values was collected;
   classifying each of a first plurality of the load values;
   process the classified first plurality of values to create a model for predicting a load value of the server;
   using the model to generate a first predicted load value of the server for a first date and a first time.

2. The method of claim 1 further comprising:
   dividing the load values into the first plurality of load values and a second plurality of load values;
   comparing the first predicted load value with a load value of the second plurality that is time stamped with the first date and the first time.

3. The method of claim 1 further comprising:
   dividing the load values into the first plurality of values and a second plurality of load values;
   using the model to generate predicted load values for respective time stamps of the second plurality of load values, wherein the first predicted load value is one of the predicted load values, and wherein the first date and the first time is the time stamp of one of the second plurality of load values;
   comparing the predicted load values with respective load values of the second plurality.

4. The method of claim 1 wherein the classified first plurality of values are processed using a support vector machine to create the model.

5. The method of claim 1 further comprising:
   using the model to generate predicted load values for respective times of a day, wherein the first predicted load value is one of the predicted load values, and wherein the first time is one of the times of the day;
   comparing the predicted load values to each other to identify an optimal load value from the predicted load values;
   scheduling the server for maintenance at the time of the day that corresponds to the optimal load value.

6. The method of claim 1 wherein the load values comprise central processing unit (CPU) load values for the server with each CPU load value expressed as a percentage.

7. The method of claim 1 wherein the load values comprise central processing unit (CPU) load values for the server with each CPU load value expressed as a percentage, memory load values for the server with each memory load value expressed as a percentage, disk load values for the server with each disk load value expressed as a percentage, and network load values for the server with each network load value expressed as a percentage.

8. The method of claim 1 wherein the load values comprise central processing unit (CPU) load values for the server with each CPU load value expressed as a percentage, memory load values for the server with each memory load value expressed as a percentage, disk load values for the server with each disk load value expressed as a percentage, or network load values for the server with each network load value expressed as a percentage.

9. The method of claim 1 wherein each of the first plurality of the load values is classified as low or high.

10. A non-transitory computer readable media storing instructions executable by one or more processors to perform a method, the method comprising:
accessing load values measured at a server over a period of time, wherein each of the load values is time stamped with a date and time at which a respective load value of the load values was collected;
classifying each of a first plurality of the load values;
process the classified first plurality of values to create a model for predicting a load value of the server;
using the model to generate a first predicted load value of the server for a first date and a first time.

11. The non-transitory computer readable media of claim 10, wherein the method further comprises:
dividing the load values into the first plurality of values and a second plurality of load values;
using the model to generate predicted load values for respective time stamps of the second plurality of load values, wherein the first predicted load value is one of the predicted load values, and wherein the first date and the first time is the time stamp of one of the second plurality of load values;
comparing the predicted load values with respective load values of the second plurality.

12. The non-transitory computer readable of claim 10 wherein the classified first plurality of values are processed using a support vector machine to create the model.

13. The non-transitory computer readable method of claim 10, wherein the method further comprises:
using the model to generate predicted load values for respective times of a day, wherein the first predicted load value is one of the predicted load values, and wherein the first time is one of the times of the day;
comparing the predicted load values to each other to identify an optimal load value from the predicted load values;
scheduling the server for maintenance at the time of the day that corresponds to the optimal load value.

14. The non-transitory computer readable of claim 10 wherein the load values comprise central processing unit (CPU) load values for the server with each CPU load value expressed as a percentage, memory load values for the server with each memory load value expressed as a percentage, disk load values for the server with each disk load value expressed as a percentage, and network load values for the server with each network load value expressed as a percentage.

15. The non-transitory computer readable of claim 10 wherein each of the first plurality of the load values is classified as low or high.

16. An apparatus comprising:
one or more processors; and
one or more non-transitory computer-readable media storing instructions executable by the one or more processors to a method, the method comprising:
accessing load values measured at a server over a period of time, wherein each of the load values is time stamped with a date and time at which a respective load value of the load values was collected;
classifying each of a first plurality of the load values;
process the classified first plurality of values to create a model for predicting a load value of the server;
using the model to generate a first predicted load value of the server for a first date and a first time.

17. The apparatus of claim 16, wherein the method further comprises:
dividing the load values into the first plurality of values and a second plurality of load values;
using the model to generate predicted load values for respective time stamps of the second plurality of load values, wherein the first predicted load value is one of the predicted load values, and wherein the first date and the first time is the time stamp of one of the second plurality of load values;
comparing the predicted load values with respective load values of the second plurality.

18. The apparatus of claim 16 wherein the classified first plurality of values are processed using a support vector machine to create the model.

19. The apparatus of claim 16, wherein the method further comprises:
using the model to generate predicted load values for respective times of a day, wherein the first predicted load value is one of the predicted load values, and wherein the first time is one of the times of the day;
comparing the predicted load values to each other to identify an optimal load value from the predicted load values;
scheduling the server for maintenance at the time of the day that corresponds to the optimal load value.

20. The apparatus of claim 16 wherein the load values comprise central processing unit (CPU) load values for the server with each CPU load value expressed as a percentage, memory load values for the server with each memory load value expressed as a percentage, disk load values for the server with each disk load value expressed as a percentage, and network load values for the server with each network load value expressed as a percentage.

* * * * *